Jan. 7, 1936. J. H. DAVIS ET AL 2,026,774
METHOD OF MAKING A PIVOT BEARING
Filed May 6, 1933
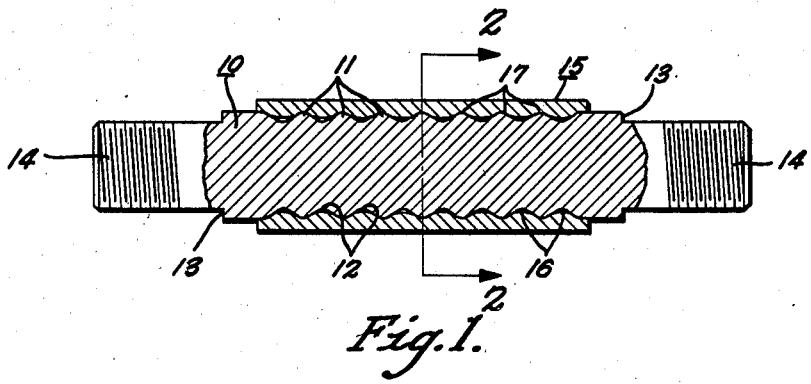
Fig.1.
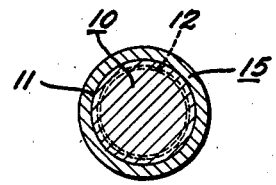
Fig.2.
Fig.3.
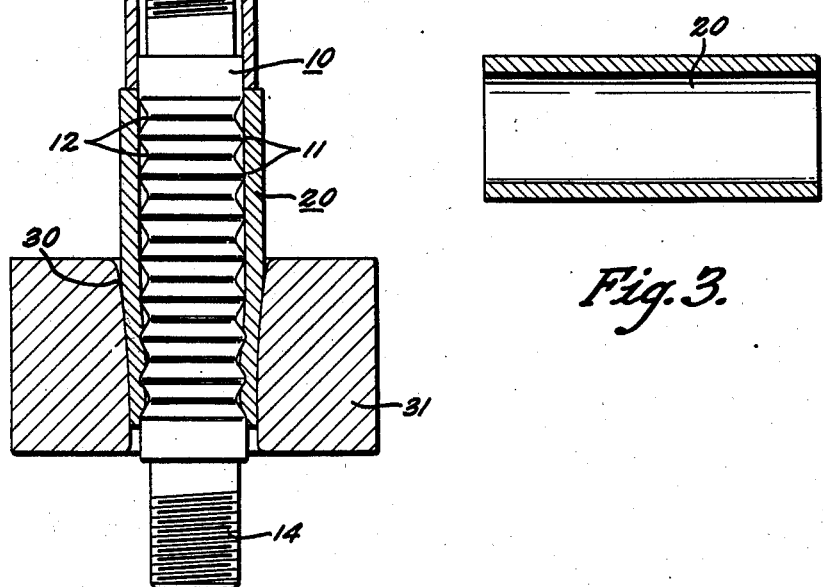
Fig.4.
INVENTORS
James H. Davis
John C. Lemming
by Spencer Hardman & Fehr
their ATTORNEYS Patented Jan. 7, 1936

2,026,774

UNITED STATES PATENT OFFICE 2,026,774

METHOD OF MAKING A PIVOT BEARING

James H. Davis and John C. Lemming, Dayton, Ohio, assignors, by mesne assignments, to General Motors Corporation, Detroit, Mich., a corporation of Delaware Application May 6, 1933, Serial No. 669,622

6 Claims. (Cl. 29—149.5)

This invention relates to a method of making a pivot bearing wherein a metallic bushing is permanently rotatably mounted upon the bearing surface of a central pivot member in such manner as to resist end thrust as well as the normal radial load.

An object of this invention is to provide a simple and efficient method of making such a pivot bearing.

A more specific object is to provide a simple and efficient method of mounting an interiorly corrugated metal bearing sleeve upon a correspondingly peripherally corrugated bearing pin to provide a permanently assembled bearing unit capable of carrying end thrust as well as radial loads.

Further objects and advantages of the present invention will be apparent from the following description, reference being had to the accompanying drawing, wherein a preferred embodiment of one form of the present invention is clearly shown.

In the drawing:

Fig. 1 shows a longitudinal section through a pivot joint unit made according to this invention.

Fig. 2 is a transverse section thereof on line 2—2 of Fig. 1.

Fig. 3 is a section of a cylindrical bearing sleeve as originally formed.

Fig. 4 is a sectional view illustrating the method of compressing the cylindrical bearing sleeve of Fig. 3 upon a peripherally corrugated bearing pin to provide corresponding interfitting corrugations upon the sleeve.

Similar reference characters refer to similar parts throughout the several views.

Numeral 10 designates a bearing pin of any suitable material, such as hardened steel, having a series of peripherally extending annular ridges 11 and grooves 12 upon the bearing surface thereof. These annular ridges and grooves may be conveniently machined in pin 10 prior to hardening the same to provide a good wear-resisting bearing surface. The pin 10 is shown as having shoulders 13 and threaded ends 14 of reduced diameter by means of which it may be suitably fixed to its supporting member. The particular form of pivot joint member shown in Fig. 1 is designed for use in spring shackles of automobiles.

The interiorly corrugated bearing sleeve 15 is permanently rotatably mounted upon the corrugated bearing surface of pin 10, as clearly illustrated in Fig. 1. The inwardly projecting annular ridges 16 of sleeve 15 interfit within the corresponding annular grooves 12 in pin 10, and the annular ridges 11 in pin 10 interfit with the valleys 17 in sleeve 15 to provide a snugly fitting rotating assembly. Obviously the bearing sleeve 15 is so mounted upon the pin 10 that relative endwise movement between the two is highly resisted by the transverse projected areas of the entire series of interfitting ridges and grooves. In other words, bearing sleeve 15 has a relatively large end thrust bearing area upon pin 10 and hence this bearing unit can properly carry a large end thrust as well as normal radial loads. This feature of this bearing unit makes it especially suitable for use in automobile spring shackles, where quite severe end thrusts occur and are difficult to provide for by any simple and inexpensive means. In using this bearing unit in such spring shackles, the bearing sleeve 15 may be rigidly fixed within the usual spring eye either by a direct pressed fit therein or by first enclosing sleeve 15 within a protective metal sleeve of harder material and then pressing such protective sleeve within the spring eye, or by any other suitable method. The usual side links of the shackle may be rigidly fixed to the pin 10 by inserting the reduced end portions 14 of the pin through suitable holes in the links and clamping the links tightly against shoulders 13 by nuts screwed upon the threaded ends 14, or by any other suitable means.

Figs. 3 and 4 illustrate steps in the method of making the bearing unit of Figs. 1 and 2. Fig. 3 illustrates a plain cylindrical bushing 20 which is just large enough to slip endwise over the pin 10 and is later deformed to make the corrugated sleeve 15. Bushing 20 may be of any suitable easily deformable bearing metal, but preferably is of a finely porous bronze material capable of absorbing a considerable amount of lubricating oil. Such porous bronze plain bushings can be readily made by well-known processes, such as described in the patent to Williams No. 1,642,347, September 13, 1927.

This plain cylindrical bushing 20 is slipped endwise over the corrugated pin 10 to its proper position and is then compressed radially inward from the outside thereof until the annular ridges 11 on pin 10 are forced into the originally smooth interior surface of the bushing 20 to form the series of ridges 16 and grooves 17 therein. A convenient method of so deforming bushing 20 to provide the corrugated sleeve 15 is shown in Fig. 4. The pin 10 and bushing 20 are forced in assembled relationship through a tapered hole 30 in die 31 by means of a plunger 32. The end face of plunger 32 engages the end of bushing 20 while the end of pin 10 engages the bottom 33 of the recess 34 in plunger 32. Thus there will be no tendency for the pin and bushing 20 to move endwise relative to each other while they are being forced through the die, and hence the desired formation of the grooves and ridges in the bushing will be greatly facilitated. If desired, the assembled pin and bushing may be forced through a succession of progressively smaller tapered dies to provide the necessary deformation of the bushing. In some cases where the metal of bushing 20 is quite easily deformed down into the grooves 12 of pin 10, only one passage through a tapered hole is necessary. Where the bushing 20 is of the above described porous bronze this deformation is greatly facilitated due to the ease with which the ridges 11 on pin 10 will imbed themselves in the interior wall of bushing 20.

If desired, any other suitable method for deforming bushing 20 upon pin 10 may be used, such as swaging bushing 20 radially inward upon the pin 10.

While the form of embodiment of the present invention as herein disclosed, constitutes a preferred form, it is to be understood that other forms might be adopted, all coming within the scope of the claims which follow.

What is claimed is as follows:

1. The method of making a sliding pivot assembly, comprising: providing a pin member having a bearing surface including peripheral corrugations extending therearound, providing a metal bushing of sufficient internal diameter to slip endwise over said corrugated pin, inserting said pin within said bushing, and then permanently deforming said metal bushing upon said peripheral corrugations on the pin to provide interfitting corresponding corrugations on the inner surface of said bushing, whereby said pin and bushing are permanently but rotatably assembled together.

2. The method of making a sliding pivot assembly, comprising: providing a pin member having a bearing surface including peripheral corrugations extending therearound, providing a metal bushing of sufficient internal diameter to slip endwise over said corrugated pin, inserting said pin within said bushing, and then radially contracting said bushing upon said pin and thereby permanently deforming the inner surface of said bushing to provide grooves interlocking with said peripheral corrugations and preventing relative endwise movement but permitting relative rotary sliding.

3. The method of making a sliding pivot assembly, comprising: providing a pin member having a bearing surface including peripheral corrugations extending therearound, providing a metal bushing of sufficient internal diameter to slip endwise over said corrugated pin, inserting said pin within said bushing, and then radially contracting said bushing upon said pin by forcing the assembled bushing and pin together through a reducing die and forcing said corrugations to form corresponding grooves in the inner face of said metal bushing.

4. The steps in the method of making a permanently assembled pivot pin and bushing, comprising: providing a pivot member having a series of annular ridges thereon, providing a metal bushing therefor of sufficient internal diameter to slip endwise over said ridges on said pivot member, inserting said pivot member endwise within said bushing, and then radially contracting said bushing directly upon said pivot member therein with such high force as to cause said ridges to permanently deform and compress corresponding grooves on the interior surface of said bushing.

5. The steps in the method of making a permanently assembled pivot pin and bushing, comprising: providing a pivot member having a series of annular ridges thereon, providing an oversize compressible porous metal bushing of sufficient internal diameter to slip endwise over said ridges on said pivot member, placing said oversize bushing around said pivot member, and then compressing said bushing from the outside thereof with sufficient force to permanently deform same into interfitting relationship with the annular ridges on said pivot member.

6. The steps in the method of making a permanently assembled pivot pin and bushing, comprising: providing a pivot member having a bearing surface irregular in longitudinal contour but circular in transverse sections thereof, providing a metal bushing for said bearing surface having a sufficient internal diameter to slip endwise thereupon, inserting said pivot member endwise within said bushing, and then radially compressing said bushing from the outside thereof with sufficient force to permanently deform same into interfitting relationship with said irregular bearing surface on said pivot member.

JAMES H. DAVIS.
JOHN C. LEMMING.